United States Patent [19]

Thomeer

[11] Patent Number: 4,971,147
[45] Date of Patent: Nov. 20, 1990

[54] CABLE CLAMP FOR COILED TUBING

[75] Inventor: Bart Thomeer, Houston, Tex.

[73] Assignee: Dowell Schlumberger, Tulsa, Okla.

[21] Appl. No.: 329,150

[22] Filed: Mar. 27, 1989

[51] Int. Cl.$^5$ ............................................. E21B 17/20
[52] U.S. Cl. .................................... 166/65.1; 166/243;
24/268
[58] Field of Search ................ 166/65.1, 77, 117, 243;
24/25, 268, 483, 522

[56] References Cited

U.S. PATENT DOCUMENTS

| | | | |
|---|---|---|---|
| 1,787,734 | 1/1931 | Rowling | 24/268 |
| 2,073,338 | 3/1937 | Durkee | 24/25 |
| 2,574,107 | 11/1951 | Joy | 24/268 |
| 4,697,641 | 10/1987 | White | 166/65.1 |
| 4,725,783 | 2/1988 | Miyairi et al. | 166/65.1 |

FOREIGN PATENT DOCUMENTS 488002  1/1976  U.S.S.R. ................................ 166/77

Primary Examiner—Ramon S. Britts
Assistant Examiner—Terry Lee Melius
Attorney, Agent, or Firm—Stephen A. Littlefield

[57] ABSTRACT

An electrically conductive cable is held within the inner bore of a well tool connected to coiled tubing by a clamp which comprises a split ring having radially outwardly extending lug portions on the split ends of the ring. The lug portions are located within a longitudinally upward slot of a sleeve located within the inner bore of the well tool. Upon application of tensional force to the cable, the lugs of the split ring clamp are drawn into the taper thereby compressing the split ring in tighter engagement with the outer surface of the cable.

5 Claims, 1 Drawing Sheet

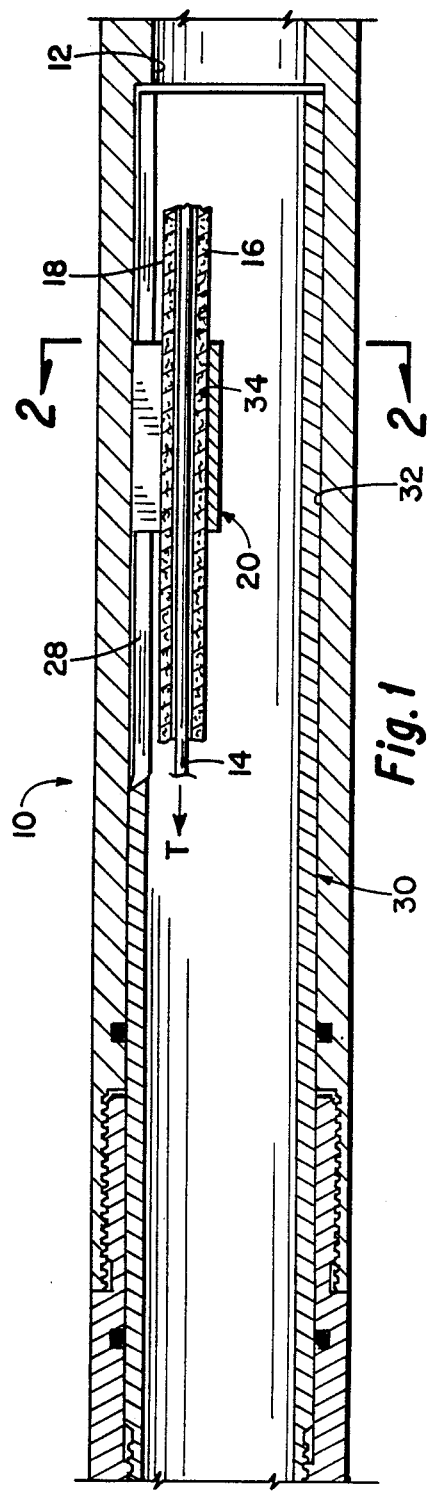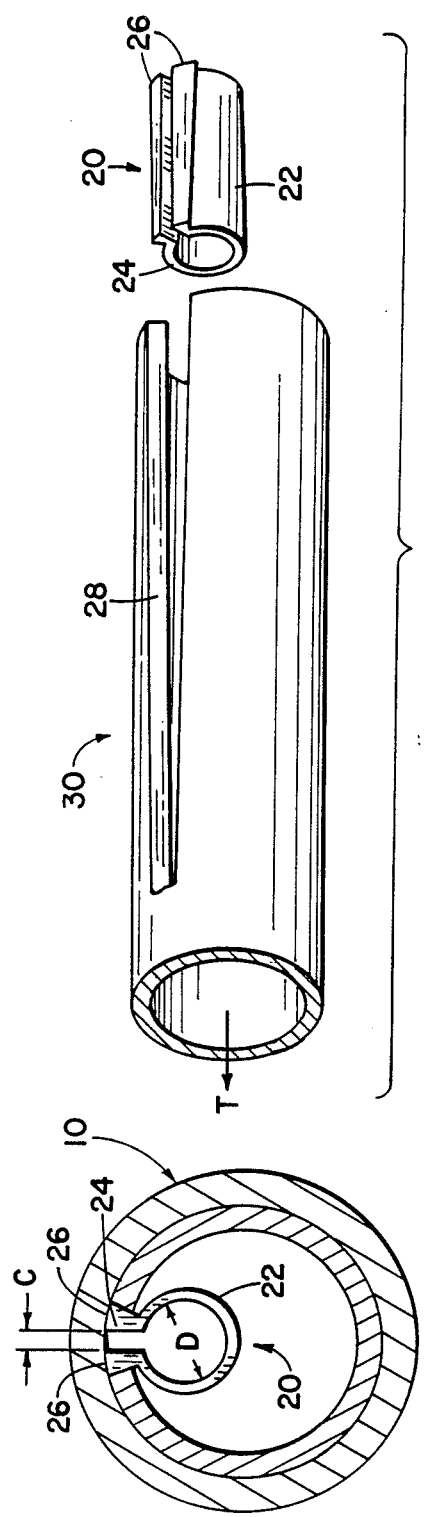

CABLE CLAMP FOR COILED TUBING

This invention relates to the art well operations and, more particularly to well operations carried out with coiled tubing having electrically conductive cable passing therethrough for use with logging tools and the like.

BACKGROUND OF THE INVENTION

Standard logging operations have typically involved use of a logging tool which is lowered into the well on a wire including an electrically conductive cable which establishes electronic communication between the logging tool and the surface. Since gravity is the sole means by which the logging tool passes downwardly through the well, standard wireline logging procedures are impracticable for highly deviated and horizontal wells.

In recent years, coiled tubing has been used to effect well logging with the well logging tool attached to the end of the coiled tubing and the necessary wireline cable passing through the inner bore of the coiled tubing. Since the coiled tubing is substantially rigid, the logging tool can be pushed on the coiled tubing laterally outward through highly deviated and horizontal wells. An additional advantage is also available when coiled tubing is used. The internal flow passage of the coiled tubing allows normal coiled tubing operations to be performed either simultaneously with the well logging or, at least, within the same "trip" into the well. Thus, hydraulic packers may be set and released, fluids my be spotted into the well, etc.

The use of logging tools with coiled tubing is not without some difficulty, however. Over the long length of tubing, there is substantial stretch and stretch cycling of both the coiled tubing and the electrical cable passing therethrough. While such stretching is normal and expected with the coiled tubing, the stretching of electrical cable can result in a separation and disconnection of the cable from the logging tool.

In the past, to overcome the problems of cable separation, it has been common to employ an end clamp to secure the lower end of the cable within the logging tool. The clamp generally comprises a split disc transverse to the fluid flow passage which clampingly engages the outer sheath of the cable. In order to maintain the flow passage through such a clamp, the clamp commonly includes a number of holes or slots passing therethrough which allow fluid communication past the clamp. Obviously, however, there is a substantial restriction in the flow passage with the use of this type of clamp.

SUMMARY OF THE INVENTION

The present invention provides a cable clamp for securing the end of a cable in a tool connected to coiled tubing which avoids substantially any restriction in the fluid flow area which is attributable to the clamp while providing a stronger clamping force than that previously available with a split disc clamp.

In accordance with the invention, a well tool having an inner bore passing therethrough and an electrically conductive cable having an outer surface passing within the inner bore further includes a split ring clamp surrounding the outer surface of the cable, end portions of the split ring including radially outwardly extending lug portions. Additionally, a cylindrical sleeve is provided within the inner bore of the well tool, the sleeve including longitudinally oriented tapered slot means for receiving the lug portions of the split ring clamp. The tapered slot means is oriented so that a wide end thereof opens in an opposite direction from a longitudinal tension force acting along the electrically conductive cable whereby longitudinal displacement of the electrically conductive cable and clamp in the direction of the tension force causes movement of the split ring clamp longitudinally along the tapered slot toward a narrow end thereof thereby increasing the clamping force of the split ring clamp on the outer surface of the electrically conductive cable.

It is therefore an object of this invention to provide a cable clamp for retaining an electrically conductive cable within a well tool attached to coiled tubing.

It is a further object of this invention to provide a cable clamp which increases its clamping force on the outer surface of the cable with increased tensional forces acting on the cable.

BRIEF DESCRIPTION OF THE DRAWINGS

These and other objects of the invention are accomplished through the manner and form of the present invention to be described in the more limited aspects of a preferred embodiment thereof and in conjunction with the accompanying drawings forming a part of this specification and in which:

FIG. 1 is a longitudinal cross-sectional view of a portion of a well tool and cable illustrating the clamp of the present invention.

FIG. 2 is a cross-sectional view of the well tool taken along line 2—2 of FIG. 1 and, FIG. 3 is an exploded isometric view of the slotted sleeve and cable clamp in accordance with the present invention showing the manner of assembly.

DETAILED DESCRIPTION OF THE PREFERRED EMBODIMENTS AND THE DRAWINGS

Referring now to the drawings wherein the showings are for the purpose of illustrating a preferred embodiment of the invention only and not for the purpose of limiting same, FIG. 1 shows a well tool 10 which is connected to a lower end of coiled tubing (not shown). The well tool 10 is substantially cylindrical and has an inner bore 12 through which fluid communication is established between the inner bore of the coiled tubing and other portions of the well tool such as packer inflate valves, cross-over valves, spotting valves and the like. Passing longitudinally within the inner bore 12 is an electrically conductive cable 14 having an outer sheath 16 with an outer surface 18. In accordance with normal wireline and coiled tubing operations, the outer sheath 16 is made of a material which is resistant to both well fluids and treatment fluids to be pumped through the inner bore 12. A longitudinal tension force T acts along the electrically conductive cable 14 and tends to cause a strain on any interconnection of the cable with logging tools and the like (not shown).

In accordance with the invention, the electrically conductive cable 14 is restrained against movement caused by the tensional force T by a clamp 20. The clamp 20 generally comprises a substantially cylindrical split ring portion 22 (FIGS. 2 and 3) having split ring ends 24 which include radially outwardly extending lugs 26. Further in accordance with the invention, the lugs 26 of the clamp 20 are received within a longitudinally tapered slot 28 (FIGS. 1 and 3) of a substantially cylindrical sleeve 30 located within the inner bore 12 of the well tool 10. In accordance with the preferred embodiment of the invention, the sleeve 30 is restrained against longitudinal movement within the tool 10 by being located within a slightly enlarged bore section 32 of the well tool 10.

As clearly shown in FIG. 1, the well tool 10 has a longitudinal axis "a" passing therethrough. The longitudinal axis of the sleeve 30 located within the well tool 10 coincides with the longitudinal axis "a" of the well tool 10. In accordance with the invention, the clamp 20 is located eccentrically within the sleeve 30 so that the longitudinal axis "b" of the clamp 20 does not coincide with the longitudinal axis "a" of both the sleeve 30 and the tool 10. This feature effects the desired result of minimizing the flow path restriction through the central bore 12 of the well tool 10 by locating the clamp 20 and the cable 14 eccentrically of the tool to one side of the bore 12.

accordance with the invention, the tapered slot 28 tapers inwardly in the longitudinal direction of the arrow T which is the tension force tending to disconnect the cable. With clamping engagement of the clamp 20 on the outer surface 18 of the electrically conductive cable 14, tensional forces acting in the direction of arrow T tend to pull the clamp 20 in that direction along the longitudinal slot 28 of the sleeve 30. The lugs 26 in engagement with the tapered slot 28, tend to decrease the gap C between the lugs 26 thereby effectively decreasing the diameter D (FIG. 2) of the clamp thereby increasing the clamping force against the outer surface 18 of the electrically conductive cable 14.

In accordance with one preferred embodiment of the invention, the inner surface of the clamp 20 further includes gripping means such as a plurality of teeth or threads 34 (FIG. 1) which tend to further increase the grip of the clamp 20 on the outer surface 18 of the electrically conductive cable 14.

In yet another preferred form of the invention, the cylindrical split ring portion 22 of the clamp 20 incorporates a conical taper in the opposite direction of the taper of the tapered slot 28 so that the conical taper in conjunction with the tapered slot 28 acts to provide substantially uniform clamping force against the outer surface 18 of the electrically conductive cable 14 over the entire length of the clamp 20.

While the invention has been described in the more limited aspects of a preferred embodiment thereof, other embodiments have been suggested and still others will occur to others skilled in the art upon a reading and understanding of the foregoing specification. It is intended that all such embodiments be included within the scope of this invention as limited only by the appended claims.

Having thus described my invention, I claim:

1. In a well treatment system wherein an electrically operable tool is connected to a remote end of coiled tubing having an electrically conductive cable passing therethrough to establish electrical communication between the tool and surface equipment, the tool having a first longitudinal axis and an inner bore and the electrically conductive cable having an outer surface, the improvement which comprises a cylindrical sleeve having a second longitudinal axis which coincides with said first longitudinal axis and further having a longitudinally tapered slot therein located within the inner bore of the well tool and a split ring clamp having a third longitudinal axis eccentric with said first and second longitudinal axes and further having end portions, the clamp encircling a substantial portion of the outer surface of said cable, said split ring clamp further including radially outwardly extending lug portions extending into said longitudinally tapered slot of said sleeve whereby tension forces applied to said cable cause said clamp and said lugs to move longitudinally within said tapered slot thereby reducing a gap between said ends of said split ring.

2. The system as set forth in claim 1 wherein an inner surface of said split ring clamp further include gripping means.

3. The system as set forth in claim 2 wherein said gripping means comprises helical threads.

4. The system as set forth in claim 2 wherein said gripping means comprises radially inwardly extending teeth.

5. The system as set forth in claim 1 wherein an inner surface of the split ring clamp has a conical taper in a direction opposite to that of said tapered slot.

* * * * *